UNITED STATES PATENT OFFICE.

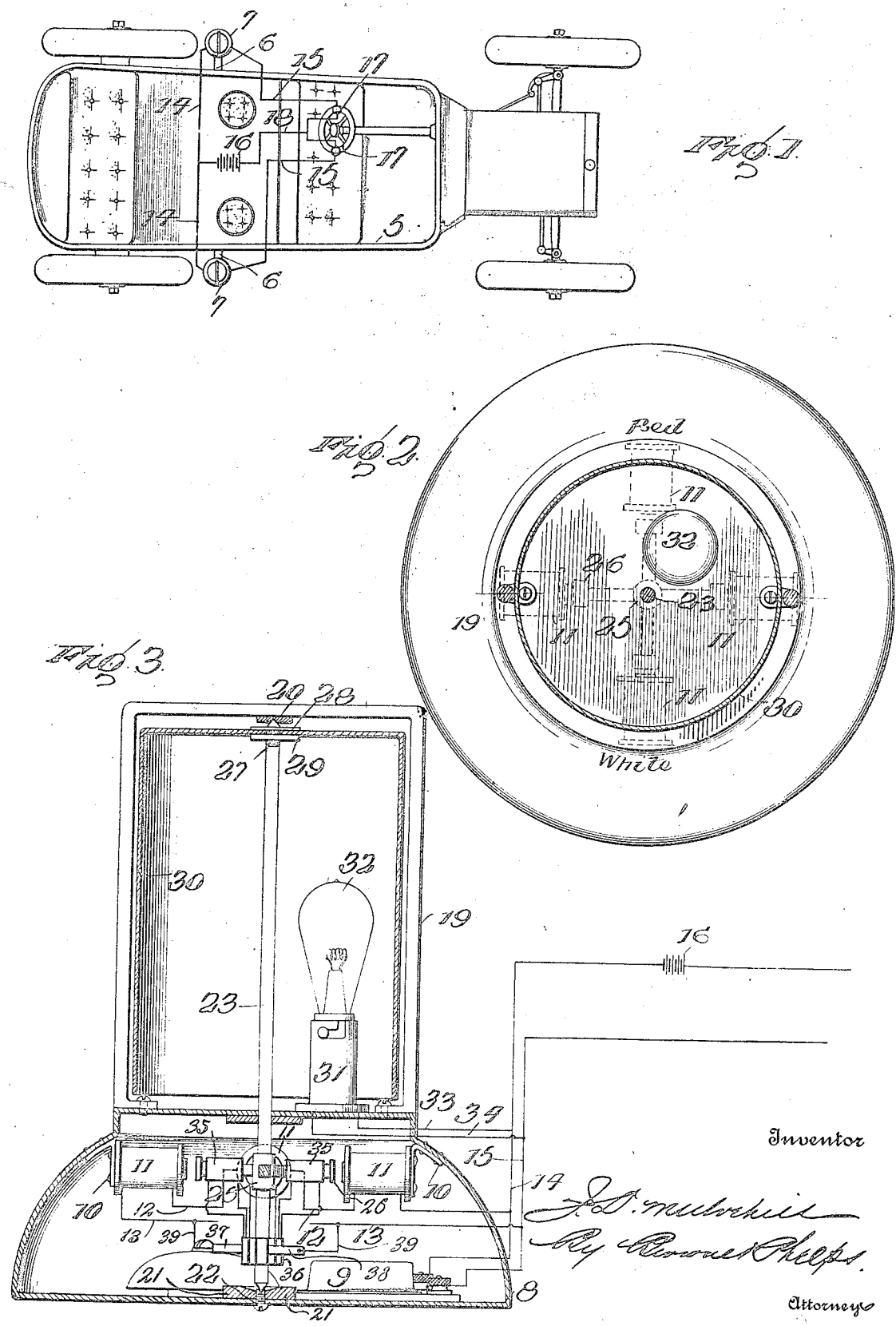

JOHN D. MULVEHILL, OF SPOKANE, WASHINGTON.

SAFETY-SIGNAL FOR AUTOMOBILES.

1,236,099.

Specification of Letters Patent.

Patented Aug. 7, 1917.

Application filed January 13, 1916. Serial No. 72,744.

*To all whom it may concern:*

Be it known that I, JOHN D. MULVEHILL, a citizen of the United States, residing at Spokane, in the county of Spokane and State of Washington, have invented certain new and useful Improvements in Safety-Signals for Automobiles, of which the following is a specification.

This invention relates to direction indicators and more particularly that class of such mechanism as is adapted to be displayed upon automobiles or other moving vehicles, in order to indicate the direction of travel of the moving vehicle upon which the signal is displayed.

The primary object of this invention is to provide a novel means by which the deviation of a vehicle from a straight course may be audibly and visually indicated in order that traffic may be aware of the direction the moving vehicle is about to take, and thus prevent accidents due to misunderstanding of the course thereof.

A still further object of the invention is to provide a signal of the character described which may be operated electrically through the medium of a plurality of push buttons attached to the steering wheel of the vehicle and operated as desired by the driver thereof.

A still further object of the invention is to provide a device of the character described which may be equally effective in the day time or at night, due to the audible and visual signals being combined in the same device.

With the foregoing and other objects in view, as will from time to time appear, the invention consists in the peculiar arrangement and combination of the various coöperating elements of a direction indicator as hereinafter set forth in the annexed specification and more particularly defined in the claim.

Referring to the accompanying drawing forming a portion of the specification and in which the same reference characters indicate the same parts wherever used, Figure 1 is a top plan view of an automobile showing the device attached thereto;

Fig. 2 is a side elevation of one of the signals;

Fig. 3 is an enlarged vertical section therethrough, and

Fig. 4 is an enlarged transverse section.

The numeral 5 designates as a whole an automobile or other suitable vehicle having brackets 6, 6, placed at any suitable position, but preferably at the side of the car, a little to the rear thereof, and having supported thereon signaling members designated as a whole by the numeral 7, and comprising a cylindrical metallic base 8 within which is mounted an electric bell 9 and by means of suitable depending brackets 10 any suitable number of solenoids 11 arranged in a circle and connected in series by means of wires 12, 13, with lead wires 14 and 15 in connection with a battery 16, and in circuit with the push buttons 17, 17, mounted upon the steering wheel of the vehicle, the push button upon the left hand side of the vehicle controlling the operation of the signal on that side and the push button upon the right hand side of the wheel controlling the operation of the signal upon the right hand side of the vehicle, a return wire 18 from the push buttons forming the necessary circuit. The cylindrical base 8 supports an inverted U-shaped frame member 19 having a bearing block 20 in the upper extension thereof in alinement with a second bearing block 21 in the base 8 removably secured thereto by means of a screw 22 and adapted to support a shaft 23 carrying thereon an armature 24 having arms 26 corresponding in number to the solenoids 11 and adapted to aline therewith. Each of the arms 26 carries a suitable coil 35 adapted to coöperate with the solenoids 11 as in the usual type of electric motor and the shaft 23 carries a commutator 36 having brushes 37—38 connected by a shunt circuit 39. The wire 13 is shown broken away to indicate a connection for the solenoid 11 which is not shown in Fig. 3. The shaft 23 is screw threaded at its upper end 27, and supports between two screw washers 28 and 29 a hollow globe 30 only one vertical half of which is formed of white glass and the other vertical half composed of red glass. Mounted within the globe 30 upon the top of the base member 8 in a suitable socket 31 is an incandescent lamp bulb 32 connected to the lead wires 14 and 15 extending from the bell 9, by means of wires 33, 34, so as to be in circuit with the battery 16 and the corresponding button 17. The operation of the device is as follows:

When about to turn to the left and the driver of the vehicle desires to give a signal to that effect the button 17 upon the left hand side of the steering wheel is pressed to close the circuit between the battery 16 and the feed wires 14 and 15, thus energizing the solenoids 11, lighting the lamp 32 and causing the bell 9 to ring. The energizing of the solenoids 11 will cause a corresponding rotation of the armature 25, due to the operation of the series motor just described, in turn rotating the shaft 23 carrying the globe 20, which will cause an alternate displaying of the red and white portions of the globe, thus visually signaling in addition to the audible signal of the bell the fact that the vehicle is about to turn to the left.

Should it be desired to turn to the right the button upon the right hand side of the steering wheel is pressed to give a corresponding result from the signal upon the right side of the car.

What I claim is:

An indicator comprising a casing, an audible signal therein, an adjustable bearing on said casing, a shaft mounted in said bearing, a frame on said casing, a bearing on said frame for the opposite end of said shaft, a washer on said shaft, a second washer adjustably mounted on said shaft, a contrasting color screen on said shaft and held in place by said washers, a source of illumination adjacent the screen, means for rotating said shaft, and means for electrically energizing the audible signal, source of illumination and the means for rotating said shaft.

In testimony whereof I affix my signature in presence of two witnesses.

JOHN D. MULVEHILL.

Witnesses:
GRACE E. MOODEE,
ROBERT B. COLEMAN.